(12) United States Patent
Inoue et al.

(10) Patent No.: US 11,099,648 B2
(45) Date of Patent: Aug. 24, 2021

(54) TACTILE SENSATION PROVIDING APPARATUS

(75) Inventors: Hiroshi Inoue, Kanagawa (JP); Akinori Sato, Kagoshima (JP)

(73) Assignee: KYOCERA Corporation, Kyoto (JP)

( * ) Notice: Subject to any disclaimer, the term of this patent is extended or adjusted under 35 U.S.C. 154(b) by 762 days.

(21) Appl. No.: 13/818,962

(22) PCT Filed: Aug. 11, 2011

(86) PCT No.: PCT/JP2011/004562
§ 371 (c)(1),
(2), (4) Date: Feb. 25, 2013

(87) PCT Pub. No.: WO2012/026084
PCT Pub. Date: Mar. 1, 2012

(65) Prior Publication Data
US 2013/0154988 A1 Jun. 20, 2013

(30) Foreign Application Priority Data
Aug. 27, 2010 (JP) .............................. JP2010-190804
Aug. 27, 2010 (JP) .............................. JP2010-191437

(51) Int. Cl.
*G06F 3/044* (2006.01)
*G06F 3/01* (2006.01)
(52) U.S. Cl.
CPC .............. *G06F 3/016* (2013.01); *G06F 3/044* (2013.01)
(58) Field of Classification Search
CPC .......... G06F 3/041; G06F 3/044; G06F 3/016; G06F 2203/014; H03K 17/962; H03K 17/955; G01D 5/24
(Continued)

(56) References Cited

U.S. PATENT DOCUMENTS

| 7,205,978 B2 | 4/2007 | Poupyrev et al. |
| 2003/0174121 A1 | 9/2003 | Poupyrev et al. |

(Continued)

FOREIGN PATENT DOCUMENTS

| CN | 1666169 A | 9/2005 |
| CN | 101118469 A | 2/2008 |

(Continued)

OTHER PUBLICATIONS

The Taiwanese Office Action dated Oct. 29, 2013, which corresponds to Taiwanese Patent Application No. 100130530 and is related to U.S. Appl. No. 13/818,962; with English language concise explanation.

(Continued)

*Primary Examiner* — William Boddie
*Assistant Examiner* — Jeffrey Parker
(74) *Attorney, Agent, or Firm* — Studebaker & Brackett PC

(57) ABSTRACT

A tactile sensation providing apparatus, so as to reduce an influence by provision of a tactile sensation on detection of a position by a touch sensor, includes a touch sensor 11, a tactile sensation providing unit 12 disposed near the sensor 11 and configured to vibrate the sensor 11, a touch sensor control unit 20 configured to transmit a scanning signal to the sensor 11 and, by receiving the signal from the sensor 11, to detect the position of the contact to the sensor, signal lines 16, 18 configured to transmit the signal between the sensor 11 and the control unit 20, and a tactile sensation control unit 30 configured to, based on the position of the contact detected by the control unit 20, control the providing unit 12 to vibrate the sensor 11. The providing unit 12 is disposed avoiding overlapping with the lines 16, 18.

2 Claims, 10 Drawing Sheets

(58) Field of Classification Search
USPC .................................................. 345/173, 174
See application file for complete search history.

(56) References Cited

U.S. PATENT DOCUMENTS

| | | | |
|---|---|---|---|
| 2004/0204129 A1 | 10/2004 | Payne et al. | |
| 2006/0152497 A1 | 7/2006 | Rekimoto | |
| 2008/0018614 A1* | 1/2008 | Rekimoto | ..................... 345/173 |
| 2008/0024459 A1 | 1/2008 | Poupyrev et al. | |
| 2009/0153368 A1* | 6/2009 | Hur | ........................ G06F 3/0414 341/20 |
| 2010/0039396 A1 | 2/2010 | Ho et al. | |
| 2011/0193802 A1* | 8/2011 | Park | .................. G02F 1/133615 345/173 |
| 2011/0279381 A1* | 11/2011 | Tong et al. | .................... 345/173 |
| 2012/0217982 A1* | 8/2012 | Narayanasamy | .... H03K 17/962 324/686 |
| 2014/0104213 A1 | 4/2014 | Rekimoto | |
| 2014/0240266 A1 | 8/2014 | Rekimoto | |

FOREIGN PATENT DOCUMENTS

| | | |
|---|---|---|
| CN | 201302711 Y | 9/2009 |
| JP | 61-271529 A | 12/1986 |
| JP | 2001-350592 A | 12/2001 |
| JP | 2003-288158 A | 10/2003 |
| JP | 2004-078961 A | 3/2004 |
| JP | 2004-272651 A | 9/2004 |
| JP | 2004-319255 A | 11/2004 |
| JP | 2008-130055 A | 6/2008 |
| TW | 201007523 A | 2/2010 |
| TW | 201017491 A | 5/2010 |

OTHER PUBLICATIONS

An Office Action; "Notice of Reason for Rejection," issued by the Japanese Patent Office dated Dec. 3, 2013, which corresponds to Japanese Patent Application No. 2010-190804 and is related to U.S. Appl. No. 13/818,962; with English language concise explanation.
International Search Report; PCT/JP2011/004562; dated Nov. 1, 2011.
An Office Action; "Decision of Rejection," issued by the Japanese Patent Office dated Apr. 1, 2014, which corresponds to Japanese Patent Application No. 2010-190804 and is related to U.S. Appl. No. 13/818,962; with English language concise explanation.
An Office Action; "Decision of Rejection," issued by the Japanese Patent Office dated May 7, 2014, which corresponds to Japanese Patent Application No. 2010-191437 and is related to U.S. Appl. No. 13/818,962; with English language concise explanation.
An Office Action; "Notification of the First Office Action," issued by the State Intellectual Property Office of China dated Feb. 17, 2015, which corresponds to Chinese Patent Application No. 201180041378.0 and is related to U.S. Appl. No. 13/818,962; with English language translation.

* cited by examiner

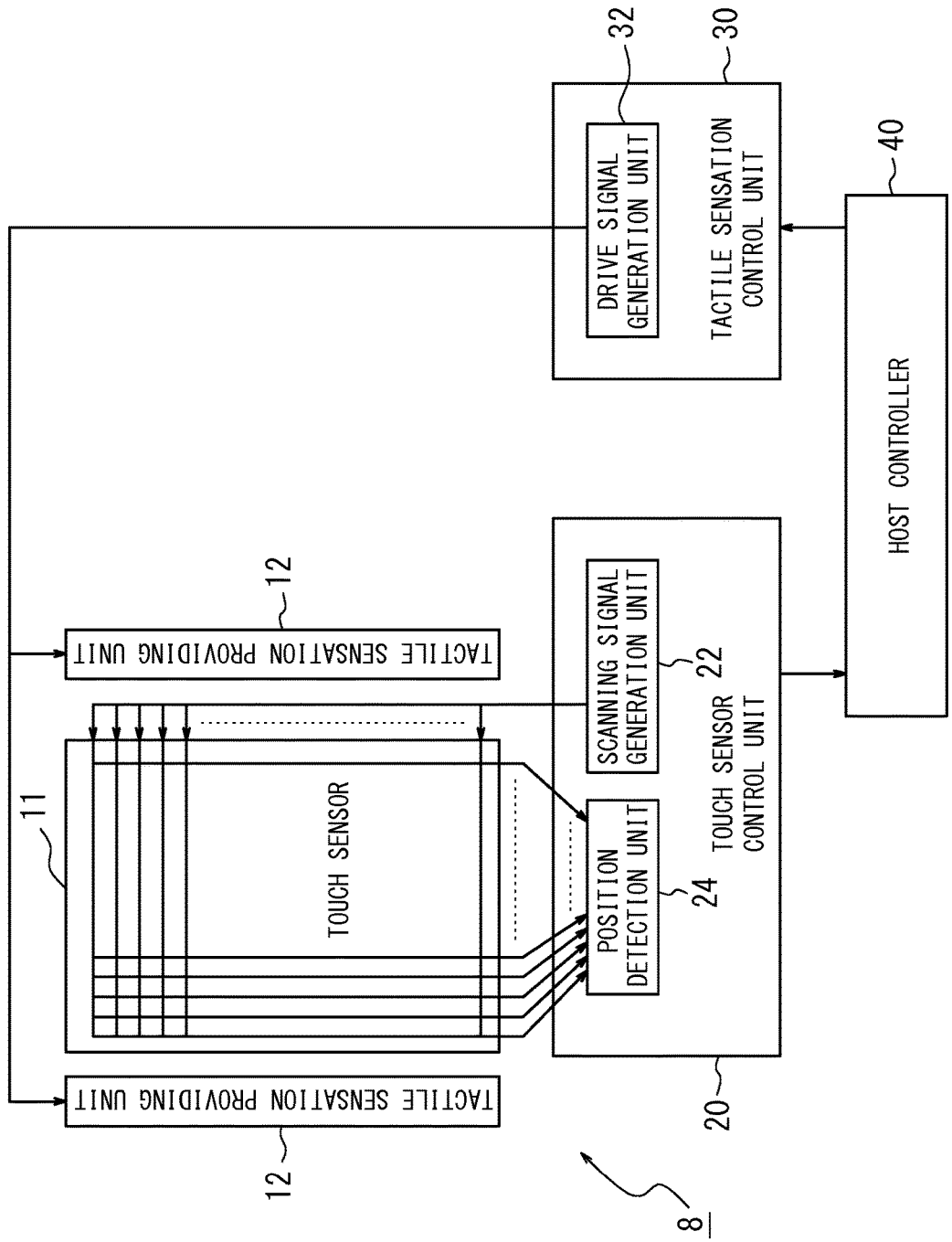

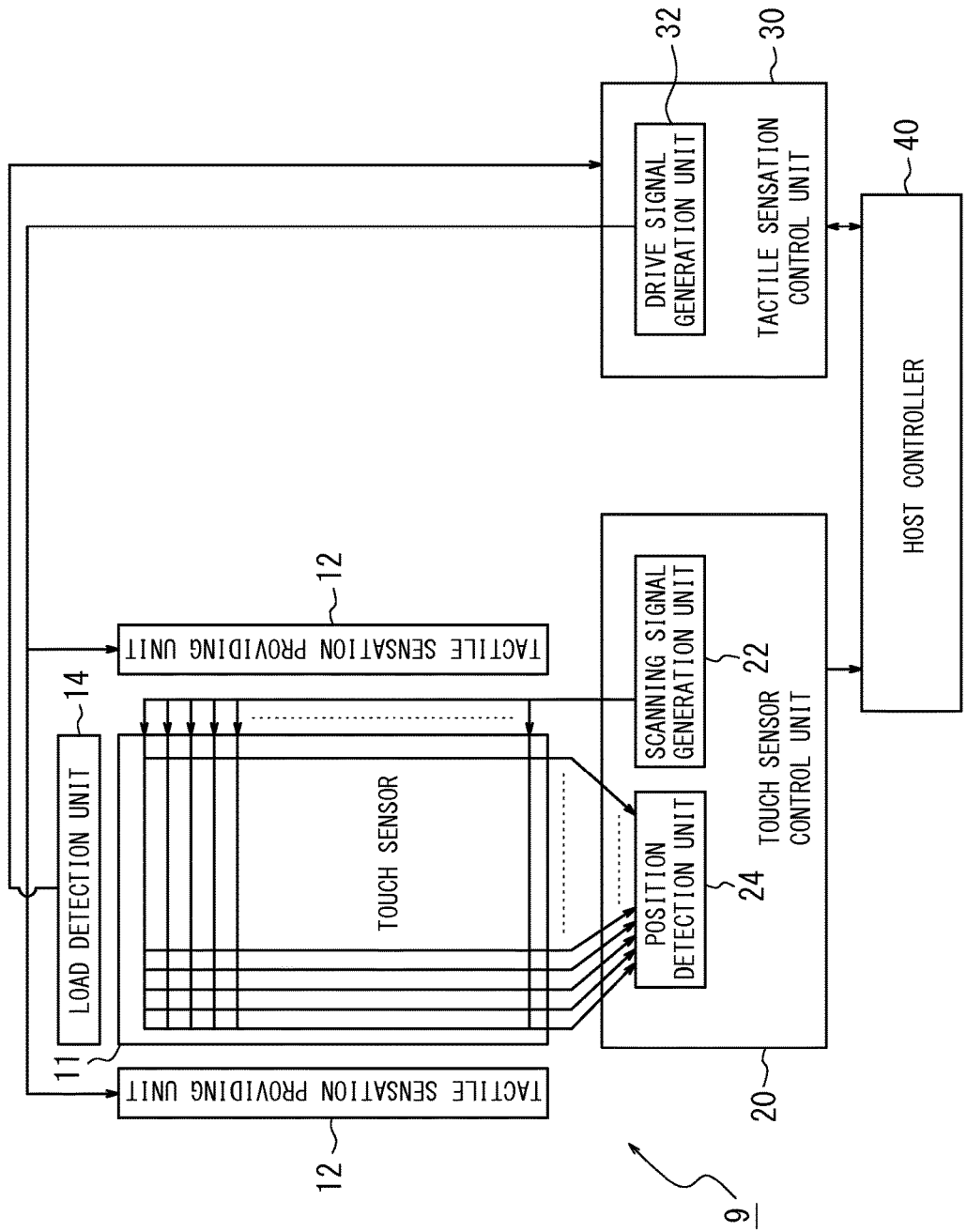

TACTILE SENSATION PROVIDING APPARATUS

CROSS REFERENCE TO RELATED APPLICATIONS

This application claims priority to and the benefit of Japanese Patent Application No. 2010-190804 and Japanese Patent Application No. 2010-191437, both of which were filed on Aug. 27, 2010, the entire contents of which are incorporated herein by reference.

TECHNICAL FIELD

The present invention relates to an apparatus for providing a tactile sensation, and more specifically, to the apparatus for providing the tactile sensation based on a contact to a touch sensor.

BACKGROUND ART

In recent years, there are mobile terminals such as mobile phones that employ input apparatuses having touch sensors such as touch panels, touch switches and the like, as input apparatuses such as operation units, switches and the like for detecting operations by operators. Such input apparatuses having touch sensors are popularly employed not only by the mobile terminals but also by information equipments such as calculators, ticket vending machines, home electric appliances such as microwaves, TV sets, lighting equipments, industrial equipments (FA equipments) and the like.

There are a variety of types of those touch sensors, such as a resistive film type, a capacitive type, an optical type and the like. Especially small terminal apparatuses such as the mobile phones often have touch panels for displaying objects of keys such as a numerical keypad and icons, such that the touch sensor detects a contact to the object by the operator.

The terminal apparatuses having such touch panels, based on application software being activated, may form a variety of user interfaces by displaying the objects. Offering easy operations and good usability to the operator, the terminal apparatuses having the touch panels have been rapidly spreading.

However, the touch sensors of any of these types detect a contact by a finger or a stylus pen and, unlike mechanical push-button switches, touch sensors themselves are not physically displaced when being touched. Therefore, in operating the touch sensor, the operator may not be able to obtain feedback in response to the operation. Accordingly, the operator may not be able to obtain an operation feeling to perceive that the key or a button is "pressed/released" in operation. In using such a terminal, as a result, the operator is likely to perform a repetitious operation by contacting the same spot multiple times, which may be stressful for the operator.

As such, there is suggested a feedback method which vibrates the touch sensor when the touch sensor detects the contact (for example, see Patent Documents 1, 2).

RELATED ART DOCUMENTS

Patent Documents

Patent Document 1: Japanese Patent Laid-Open No. 2003-288158

Patent Document 2: Japanese Patent Laid-Open No. 2008-130055

SUMMARY OF INVENTION

Technical Problem

Incidentally, the touch sensor of the capacitive type forms an electric field on an entire surface of the touch sensor when a weak electrical current is supplied to a transparent conductive film and, by obtaining a change in surface charge at a position contacted by an operator's finger or the like on the conductive film, detects the position. At this time, the touch sensor of the capacitive type obtains a contact position based on the change in the weak current flowing via a capacitance of a human body.

A tactile sensation providing apparatus having the touch sensor of the capacitive type, in order to provide feedback such as a tactile sensation to the operator by vibrating the touch sensor, needs a driving mechanism for generating vibration disposed near the touch sensor. Moreover, when such a driving mechanism is disposed near the touch sensor, the driving mechanism needs to be placed as close to the touch sensor as possible such that the driving mechanism contacts the touch sensor. Otherwise, the vibration generated by the driving mechanism is not sufficiently transmitted to the touch sensor, causing a disadvantage such as partially wasting power associated with the vibration of the touch sensor. Small terminal apparatuses such as the mobile phones, due to limitation of an internal space thereof, the driving mechanism for generating the vibration needs to be disposed close to the touch sensor.

However, when a tactile sensation providing unit such as, for example, a piezoelectric element is disposed near the touch sensor so as to vibrate the touch sensor, the electric field is generated by a voltage applied for vibrating the piezoelectric element. As described above, the touch sensor obtains the contact position based on the change in the weak electric current. Therefore, there is a problem that generation of such an electric field, even when it is a weak electric field, adversely affects detection of the position of the contact to the touch sensor. That is, when the voltage is applied for driving the tactile sensation providing unit in order to provide feedback to the operator, the touch sensor is affected and possibly fails to accurately detect the contact position.

As such, studies of recent years have been developing a touch panel having a detection mechanism capable of detecting the contact position while having certain resistance against noise by the electric field generated by the tactile sensation providing unit in providing feedback. Also, studies of techniques of noise canceling such as by devising a form of a scanning line to flow the electric current therethrough for detecting the contact position have also been in progress. Further, when a display unit such as a liquid crystal display panel is disposed on the touch sensor, the display unit generates noise as well. However, the noise may be cut off to some extent by using an appropriate capacitive digital converter or noise suppression algorithm.

Nevertheless, when the tactile sensation providing unit such as the piezoelectric element is disposed very close to such touch sensors, a negative influence by the electric field may not be sufficiently prevented. This is because, since the touch sensor, by its nature, externally receives an influence (action) and detects it, the touch sensor needs to be sensitive to an extent in order to accurately detect the contact position.

The present invention, in consideration of such a condition, is to provide a tactile sensation providing apparatus capable of reducing the influence by provision of the tactile sensation on position detection by the touch sensor.

Solution to Problem

In order to achieve the above matter, a tactile sensation providing apparatus according to a first aspect includes:

a touch sensor;

a tactile sensation providing unit disposed near the touch sensor and configured to vibrate the touch sensor;

a touch sensor control unit configured to transmit a scanning signal to the touch sensor and, by receiving the scanning signal from the touch sensor, to detect a position of a contact to the touch sensor;

a signal line configured to transmit the scanning signal between the touch sensor and the touch sensor control unit; and a tactile sensation control unit configured to, based on the position of the contact detected by the touch sensor control unit, control the tactile sensation providing unit to vibrate the touch sensor, wherein the tactile sensation providing unit is arranged avoiding overlapping with the signal line.

A second aspect is the tactile sensation providing apparatus according to the first aspect, wherein the touch sensor includes a capacitive type touch sensor.

In order to achieve the above matter, a tactile sensation providing apparatus according to a third aspect of the present invention includes:

a touch sensor;

a tactile sensation providing unit configured to vibrate the touch sensor; and a tactile sensation control unit configured to control such that a period in which scanning is performed for detecting a position of a contact to the touch sensor and a period in which the tactile sensation providing unit vibrates the touch sensor do not overlap with each other.

A fourth aspect is the tactile sensation providing apparatus according to the third aspect, wherein the touch sensor includes a capacitive type touch sensor.

A fifth aspect is the tactile sensation providing apparatus according to the third aspect, wherein the tactile sensation control unit, during the period in which the touch senor is vibrated, applies a drive voltage such that the tactile sensation providing unit generates vibration.

Effect of the Invention

According to the present invention, an influence by provision of the tactile sensation on position detection by the touch sensor is reduced, thus the touch sensor may detect a contact position with a high accuracy.

BRIEF DESCRIPTION OF DRAWINGS

FIG. 9 is a block diagram illustrating a schematic configuration of a tactile sensation providing apparatus according to a fourth embodiment of the present invention; and FIG. 10 is a block diagram illustrating a schematic configuration of a tactile sensation providing apparatus according to a fifth embodiment of the present invention.

DESCRIPTION OF EMBODIMENTS

Embodiments of the present invention will be described with reference to the accompanying drawings.

First Embodiment

Figure 1:
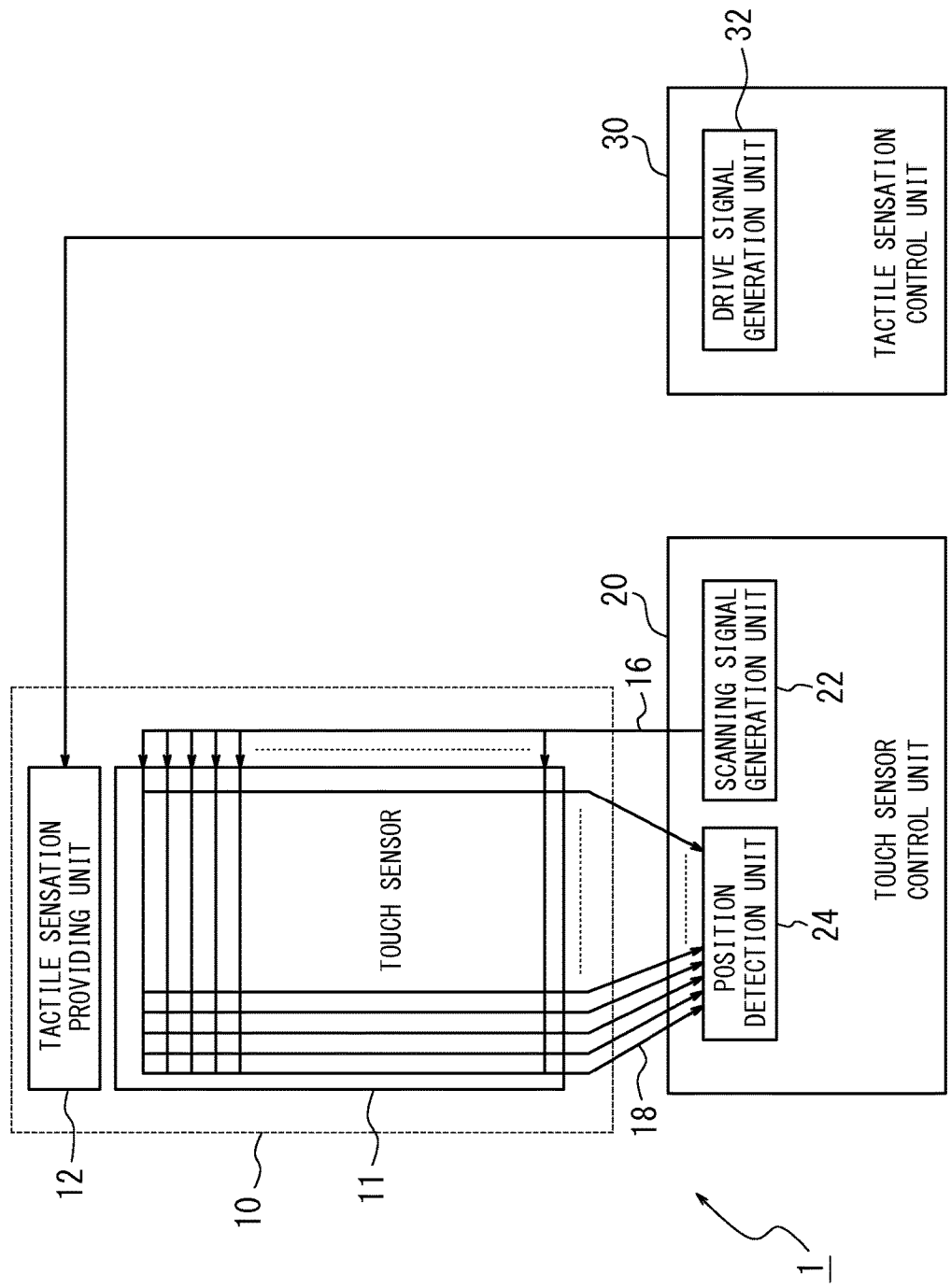
FIG. 1 is a schematic configuration diagram of a tactile sensation providing apparatus according to a first embodiment.

FIG. 1 is a functional block diagram illustrating a schematic configuration of a tactile sensation providing apparatus according to a first embodiment of the present invention. The tactile sensation providing apparatus according to the present embodiment is applicable to any apparatus such as, for example, mobile terminals such as mobile phones and gaming machines, ATM machines at banks, ticket vending machines at stations and the like, that operates based on detection of an operator's contact by a touch sensor.

As illustrated in FIG. 1, a tactile sensation providing apparatus 1 according to the present embodiment includes a substrate 10, a touch sensor 11, a tactile sensation providing unit 12, signal lines 16 and 18, a touch sensor control unit 20 and a tactile sensation control unit 30. The touch sensor control unit 20 includes a scanning signal generation unit 22 and a position detection unit 24. The tactile sensation control unit 30 includes a drive signal generation unit 32.

According to the present embodiment, the substrate 10 is disposed on a front face of a display unit constituted by using a liquid crystal display described below or the like. In order to make a display of the display unit visible, a part of the substrate 10 corresponding to a display area of the display unit preferably has transparency. The part having transparency on a front face of the substrate 10 has a touch sensor 11, which is typically in a sheet form and having transparency.

The touch sensor 11 is a sensor having a touch face and detects a contact (touch) to the touch face by an operator's finger or the like. Generally, the touch sensor 11 is of a resistive film type, a capacitive type or an optical type, for example. According to the present embodiment, the touch sensor of the capacitive type is employed. The touch sensor 11 of the capacitive type normally has a touch sensor unit having X electrodes and Y electrodes arranged in a matrix pattern. The touch sensor unit may conserve electric energy between the electrodes. When there is no contact to the touch sensor 11, the two electrodes of the sensor unit form a stable electric field. However, when a human finger approaches or contacts, the finger serves as the earth because of conductive property of a human body, thereby the electric field is changed and a capacitance value reduces at a position contacted by the finger. Based on the change in the capacitance value, the tactile sensation providing apparatus 1 may detect the position of the contact to the touch sensor 11. Note that, in FIG. 1, the X electrodes and Y electrodes of the touch sensor 11 are partially illustrated.

The touch sensor 11 has a transmissive touch face and disposed on the front face of the display unit (not illustrated). Thereby, the touch sensor 11 is used also as so called a touch panel, a sensor for detecting a touch (contact) to an object such as a key or a button displayed on the display unit. Here, the display unit (not illustrated) displays a graphically depicted object of the button, the key or an icon and may be constituted by using, for example, the liquid crystal display panel or an organic EL display panel. When the object of the key or the button is displayed on the display unit as described above and an operator contacts the object, the contact at a position corresponding to the object on the touch sensor 11 is detected. According to the present embodiment, since the tactile sensation providing apparatus 1 has the touch sensor 11 disposed on the front face of the display unit and operates based on the contact to the position of the object displayed on the display unit in a manner of arbitrary techniques, figures and detailed descriptions thereof will be omitted.

The tactile sensation providing unit 12 vibrates the touch sensor 11 and may be generally constituted by using a variety of elements. According to the present embodiment, the tactile sensation providing unit 12 is constituted by using a piezoelectric vibrator (piezoelectric element). According to the present embodiment, the tactile sensation providing unit 12 is preferably disposed near enough to the touch sensor 11 so as to sufficiently transmit vibration to the touch sensor 11. The tactile sensation providing unit 12 is disposed, being adhered or the like, at a part of the substrate 10 having no transparency, that is, a part of the substrate 10 overlapping with neither a contact detection area of the touch sensor 11 nor the display area of the display unit described above. In FIG. 1, the tactile sensation providing unit 12, on the substrate 10, is disposed near an upper portion of the touch sensor 11. Thereby, vibration generated by the tactile sensation providing unit 12 is sufficiently transmitted to the touch sensor 11. That is, wasting power due to insufficient transmission of vibration generated by the tactile sensation providing unit 12 to the touch sensor 11 may be prevented.

The touch sensor control unit 20 controls overall detection of the position of the contact to the touch sensor 11 by the operator. The touch sensor control unit 20, in order to detect the position of the contact to the touch sensor 11, supplies a scanning signal from the scanning signal generation unit 22 to the electrodes of the touch sensor 11 for scanning. The position detection unit 24 detects a change in the capacitance of the scanning signal supplied from the scanning signal generation unit 22 to the electrodes of the touch sensor 11. At this time, the position detection unit 24 receives the scanning signal from the touch sensor 11. Thereby, the touch sensor control unit 20 detects the position of the contact to the touch sensor 11 and outputs position information as a result. Since arbitrary capacitance sensing techniques are applicable, a detailed description thereof will be omitted.

According to the present embodiment, as illustrated in FIG. 1, the signal line 16 transmits the scanning signal from the touch sensor control unit 20 (that is, from the scanning signal generation unit 22) to the touch sensor 11. Further, the signal lines 18 transmit the scanning signal from the touch sensor 11 to the touch sensor control unit 20 (that is, to the position detection unit 24). As the signal lines 16 and 18, for example, flexible wires (flexible cables) may be employed. Note that the signal lines 16 and 18 are simplified in FIG. 1.

The tactile sensation control unit 30 controls overall operations of the tactile sensation providing unit 12 for providing the tactile sensation. In detail, when the tactile sensation control unit 30 receives an instruction to provide the tactile sensation, the drive signal generation unit 32 supplies a drive signal to the tactile sensation providing unit 12. Responding to the drive signal, the tactile sensation providing unit 12 vibrates the touch sensor 11, thereby providing a predetermined tactile sensation to the operator. According to the present embodiment, the tactile sensation control unit 30, based on the position of the contact to the touch sensor 11 detected by the touch sensor control unit 20, controls the tactile sensation providing unit 12 to vibrate the touch sensor 11. For example, when the contact to the position on the touch sensor 11 corresponding to the object displayed on the display unit is detected, in order to notify the operator of start of a predetermined operation corresponding to the object, the tactile sensation control unit 30 controls the tactile sensation providing unit 12 to vibrate the touch sensor 11.

When the tactile sensation providing unit 12 is disposed near the touch sensor 11 in order to vibrate the touch sensor 11 as described above, the electric filed is generated by the voltage applied for vibrating the tactile sensation providing unit 12, and thus accuracy in detection of the position of the contact to the touch sensor 11 is deteriorated. According to the present embodiment, therefore, the tactile sensation providing unit 12 is disposed avoiding overlapping with the signal lines 16 and 18 as illustrated in FIG. 1.

Since the tactile sensation providing unit 12 is disposed without overlapping with the signal lines 16 and 18 as described above and having a certain space therefrom, when the tactile sensation providing unit 12 provides the tactile sensation (that is, generating vibration), the influence by the electric field generated by generation of vibration on detection of the position on the touch sensor 11 is reduced. Accordingly, the tactile sensation providing apparatus 1 may detect the position of the contact to the touch sensor 11 with a high accuracy.

Figure 2:
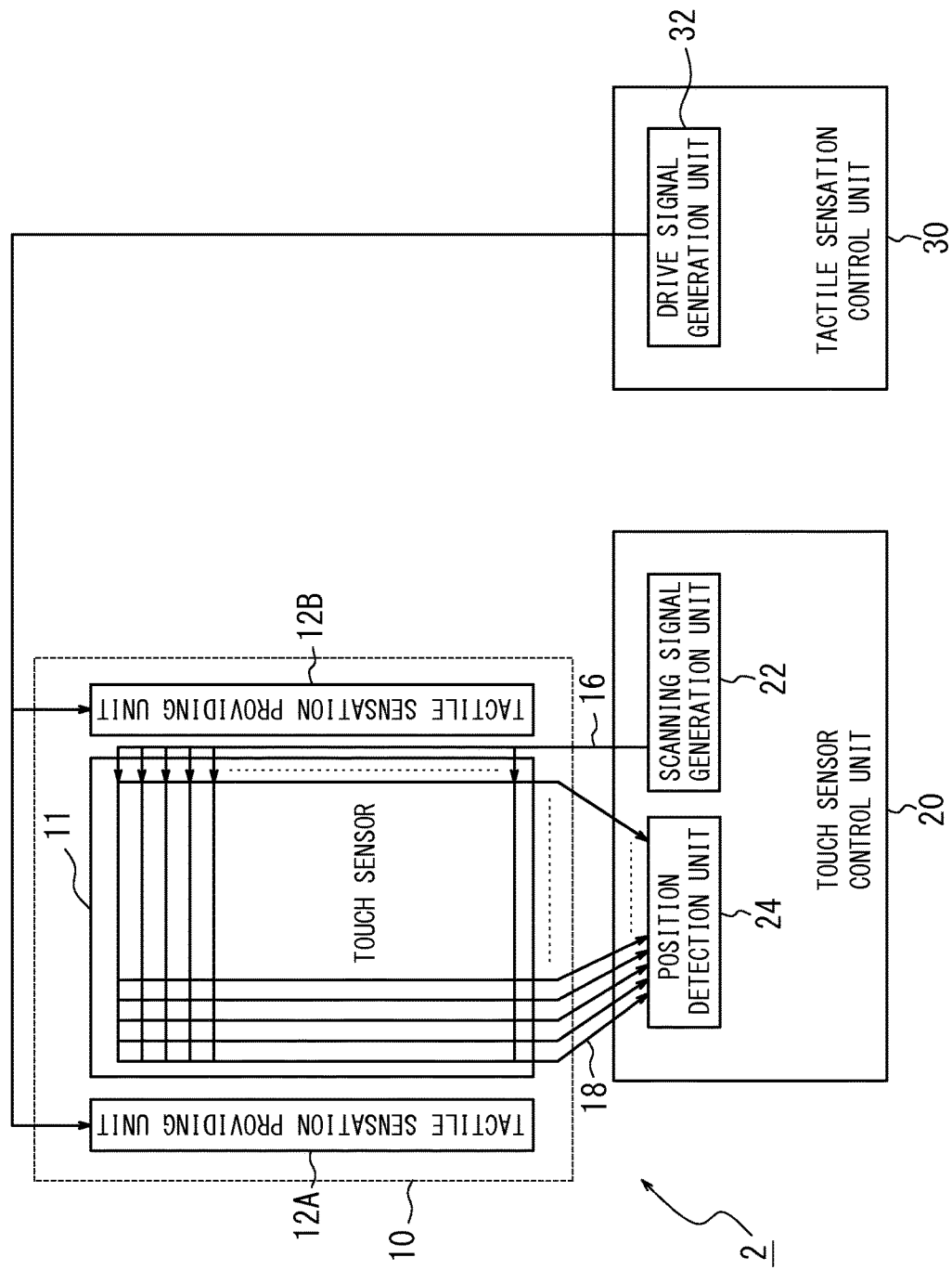
FIG. 2 is a schematic configuration diagram illustrating another example of arrangement of a tactile sensation providing unit of the tactile sensation providing apparatus according to the first embodiment.

FIG. 2 is a diagram illustrating another example of arrangement of the tactile sensation providing unit of the tactile sensation providing apparatus according to the present embodiment. A tactile sensation providing apparatus 2 illustrated in FIG. 2 has a different arrangement of the tactile sensation providing unit of the tactile sensation providing apparatus 1 according to the first embodiment described with reference to FIG. 1. Other schematic configurations of the tactile sensation providing apparatus 2 may be similar to those of the tactile sensation providing apparatus 1 according to the first embodiment.

In FIG. 2, the tactile sensation providing apparatus has two tactile sensation providing units. The tactile sensation providing apparatus 2 illustrated in FIG. 2 has a tactile sensation providing unit 12A on the left-hand side of the touch sensor 11 and a tactile sensation providing unit 12B on the right-hand side of the touch sensor 11. Accordingly, the tactile sensation by more powerful vibration than that generated by the configuration illustrated in FIG. 1 may be provided to the touch sensor 11.

In this arrangement also, the signal lines 16 and 18 are arranged avoiding overlapping with the tactile sensation providing units 12A and 12B. Therefore, this arrangement may reduce the influence by the electric field generated by vibration of the tactile sensation providing units 12A and 12B on detection of the position of the contact by the touch sensor. Accordingly, the tactile sensation providing apparatus 2 also may detect the position of the contact to the touch sensor 11 with a high accuracy.

Second Embodiment

Next, a tactile sensation providing apparatus according to a second embodiment of the present invention will be described. According to the second embodiment, the tactile sensation providing apparatus has a different arrangement of the tactile sensation providing unit or the signal lines 16 and 18 from those of the tactile sensation providing apparatus according to the first embodiment described with reference to FIG. 1 and FIG. 2. Other schematic configurations may be similar to those of the tactile sensation providing apparatus 1 or 2 according to the first embodiment. Accordingly, descriptions similar to those of the first embodiment will be appropriately omitted.

Generally, there may be a case in which, due to some configuration inside a housing of an apparatus constituting the tactile sensation providing apparatus, the signal lines 16 and 18 may not be arranged avoiding overlapping with the tactile sensation providing unit 12 as described in the first embodiment with reference to FIG. 1 or FIG. 2. Also, there may be a case in which, due to limitations of a size or a shape of each component used in designing the tactile sensation providing apparatus, the signal lines 16 and 18 may not be arranged avoiding overlapping with the tactile sensation providing unit 12. According to the second embodiment, therefore, measures taken when the signal lines 16 and 18 may not be arranged completely avoiding overlapping with the tactile sensation providing unit 12 will be described.

According to the first embodiment described above, by using the touch sensor 11 of the capacitive type, based on the change in the signal by the weak current flowing through the touch sensor 11, the position of the contact to the touch sensor 11 by the operator is detected. In detail, the scanning signal is transmitted from the scanning signal generation unit 22 to the touch sensor 11 via the signal line 16, or from the touch sensor 11 to the position detection unit 24 via the signal line 18, thereby the signal is scanned for detecting the contact to the touch sensor 11.

It is assumed that, at this time, the scanning signal transmitted from the scanning signal generation unit 22 to the touch sensor 11 via the signal line 16 is hardly influenced by other electric fields and the like after being generated by the scanning signal generation unit 22 and thus having high signal intensity. On the other hand, the scanning signal transmitted from the touch sensor 11 to the position detection unit 24 via the signal line 18 has already been scanned by the touch sensor 11 and thus changed when subjected to the capacitance of the human body. Also, since the scanning signal transmitted from the touch sensor 11 to the position detection unit 24 via the signal line 18 travels through a relatively long path, it is assumed that the scanning signal has been influenced by electromagnetic waves and the like from components in the apparatus.

Figure 3:
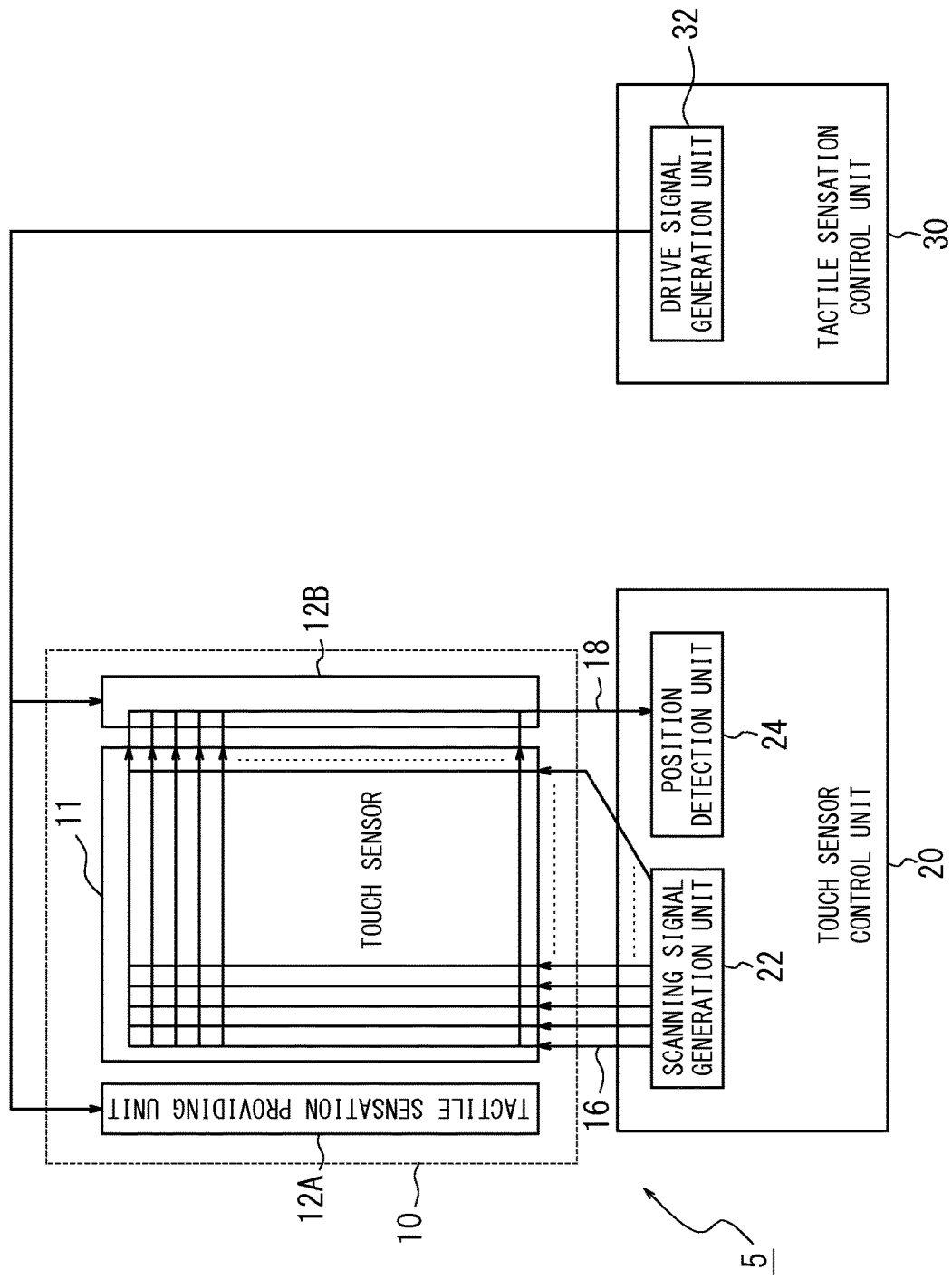
FIG. 3 is a schematic configuration diagram of a tactile sensation providing apparatus according to a second embodiment.

In a tactile sensation providing apparatus 5 illustrated in FIG. 3, for example, the signal line 18 for transmitting the scanning signal from the touch sensor 11 to the touch sensor control unit 20 overlaps with the tactile sensation providing unit 12B disposed on the right-hand side of the touch sensor 11. In such an arrangement, it may be assumed that, since the scanning signal which has already been influenced by various factors is further influenced by the electrical field generated by the tactile sensation providing unit 12B while transmitted through the signal line 18, the position of the contact to the touch sensor 11 may not be detected with a high accuracy. However, for some reasons such as a structural limitation inside the housing of the apparatus and the like, the signal lines 16 and 18 may not be disposed avoiding overlapping with the tactile sensation providing unit 12.

According to the second embodiment, accordingly, when one of the signal lines 16 and 18 is disposed overlapping with the tactile sensation providing unit 12 due to a limitation of a feature of each component or the like, the signal line 18 is disposed avoiding overlapping with the tactile sensation providing unit 12.

Figure 4:
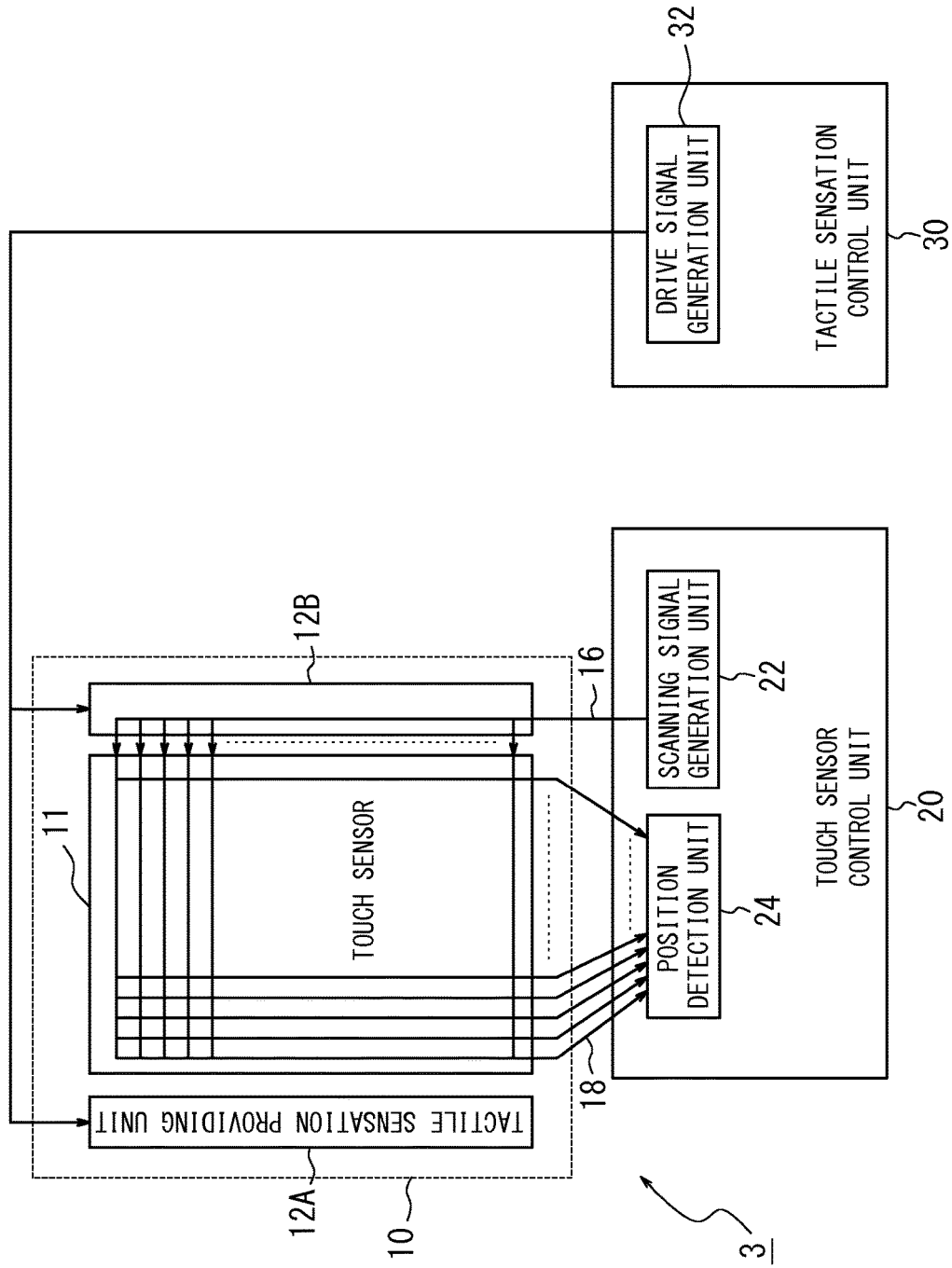
FIG. 4 is a schematic configuration diagram illustrating an example of arrangement of signal lines of the tactile sensation providing apparatus according to the second embodiment.

In a tactile sensation providing apparatus 3 illustrated in FIG. 4, for example, the signal line 16 for transmitting the scanning signal from the touch sensor control unit 20 to the touch sensor 11 overlaps with the tactile sensation providing unit 12B. However, the signal line 18 for transmitting the scanning signal from the touch sensor 11 to the touch sensor control unit 20 does not overlap with the tactile sensation providing unit. Such a configuration, when the scanning signal which has already been influenced by various factors is transmitted through the signal line 18, enables to prevent the scanning signal from being further influenced by the electric field generated by the tactile sensation providing unit 12B. According to the tactile sensation providing apparatus 3, therefore, accuracy in detection of the position of the contact to the touch sensor 11 is not significantly deteriorated.

Next, another example of the measurements according to the second embodiment taken when the signal lines 16 and 18 may not be disposed completely avoiding overlapping with the tactile sensation providing unit 12 will be described.

Figure 5:
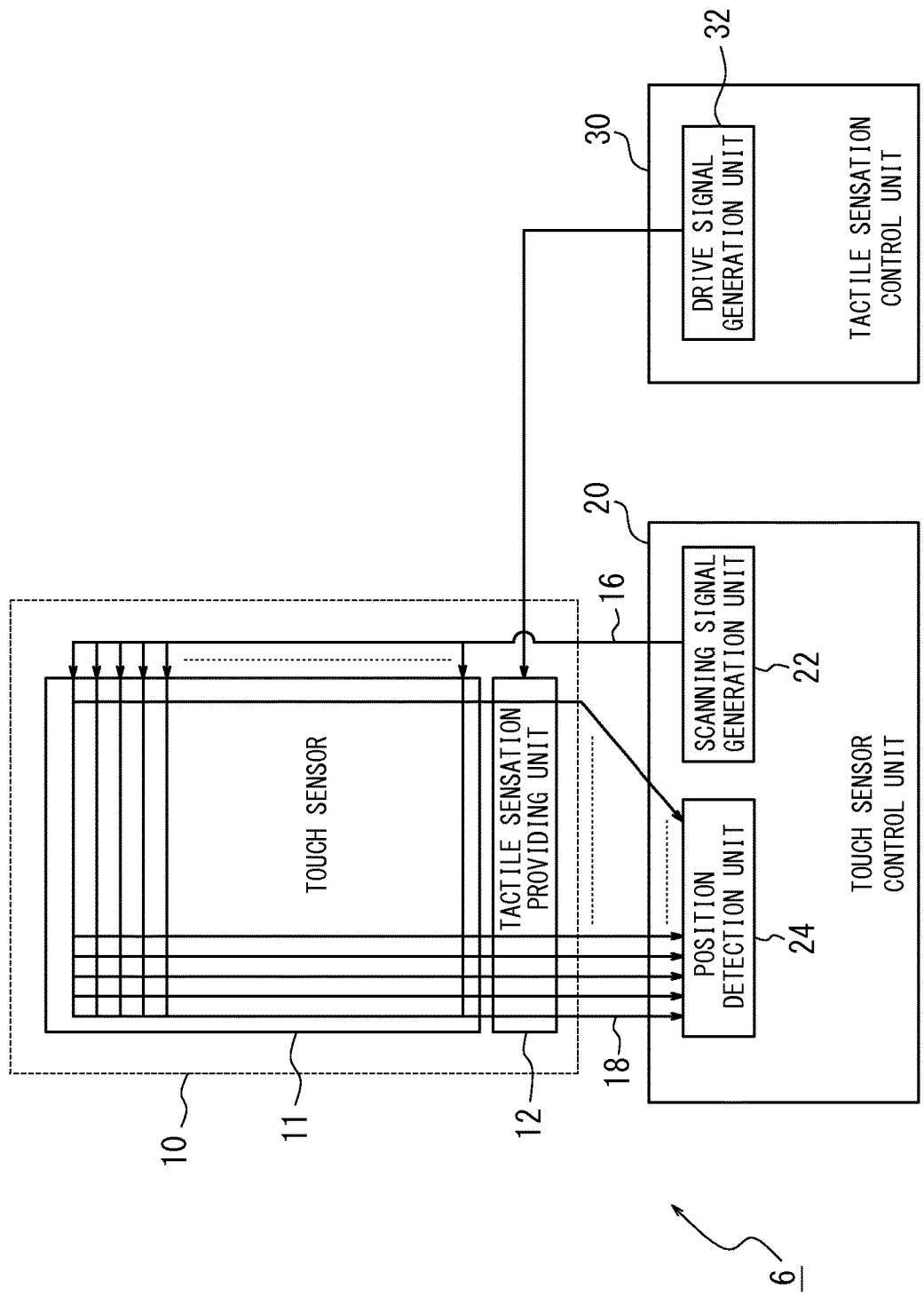
FIG. 5 is a schematic configuration diagram illustrating arrangement of the tactile sensation providing unit of the tactile sensation providing apparatus according to the second embodiment.

In a tactile sensation providing apparatus 6 illustrated in FIG. 5, the signal line 18 for transmitting the scanning signal from the touch sensor 11 to the control unit 20 overlaps with the tactile sensation providing unit 12 disposed under the touch sensor 11. In such a configuration, it is assumed that, when the scanning signal which has already been influenced by various factors is transmitted through the signal line 18, the scanning signal is further influenced by the electric field generated by the tactile sensation providing unit 12 and the position of the contact to the touch sensor 11 may not be detected with a high accuracy. However, for some reasons such as the structural limitation inside the housing of the apparatus and the like, the tactile sensation providing unit 12 may have no choice but to be disposed as illustrated in FIG. 5.

In such a case, according to the second embodiment, the signal line 18 is disposed avoiding overlapping with the tactile sensation providing unit 12.

Figure 6:
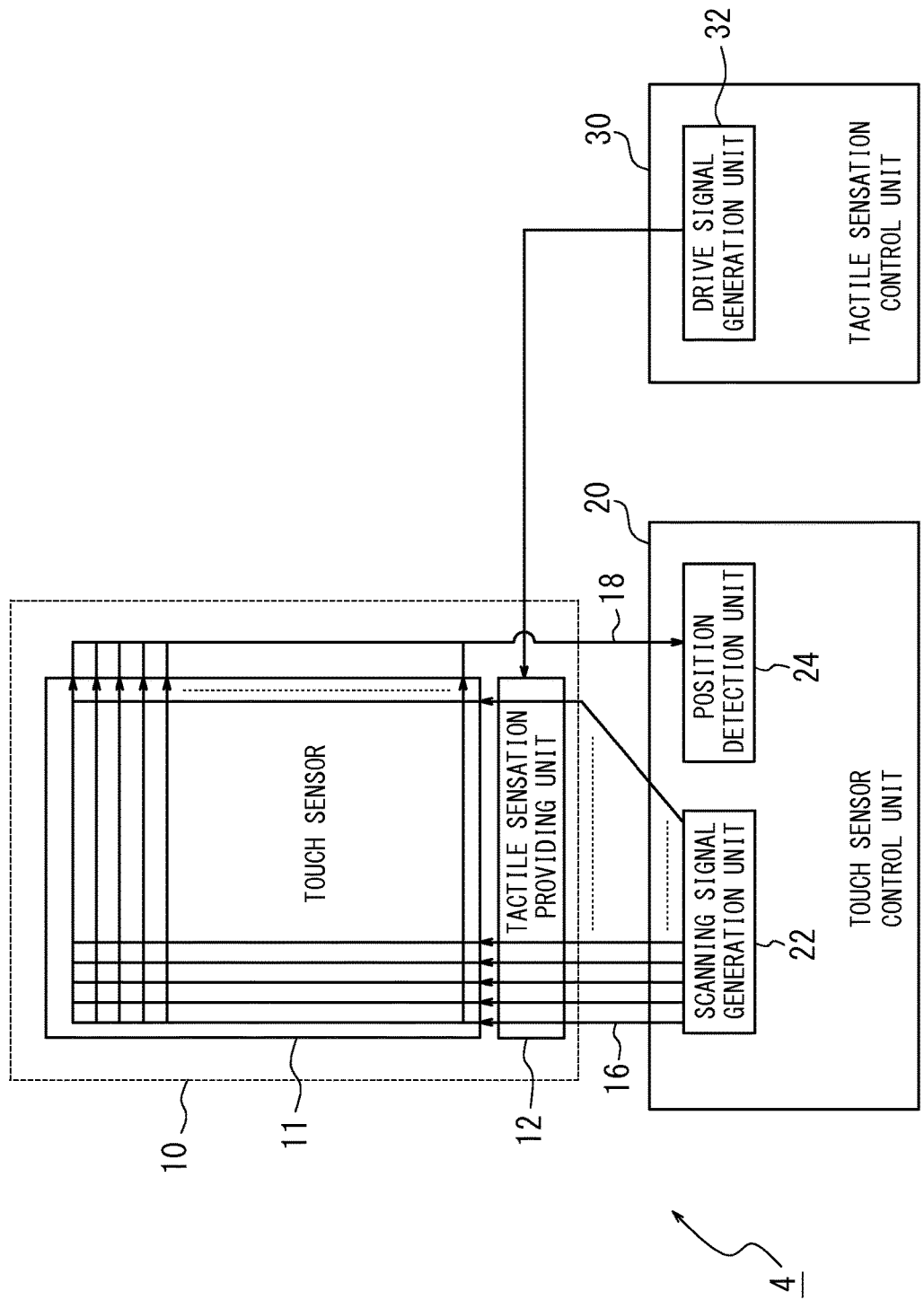
FIG. 6 is a schematic configuration diagram illustrating another example of arrangement of the signal lines of the tactile sensation providing apparatus in FIG. 5.

In a tactile sensation providing apparatus 4 illustrated in FIG. 6, for example, the signal line 16 for transmitting the scanning signal from the touch sensor control unit 20 to the touch sensor 11 overlaps with the tactile sensation providing unit 12. However, the signal line 18 for transmitting the scanning signal from the touch sensor 11 to the touch sensor control unit 20 does not overlap with the tactile sensation providing unit 12. Such a configuration, when the scanning signal which has already been influenced by various factors is transmitted through the signal line 18, enables to prevent the scanning signal from being further influenced by the electric field generated by the tactile sensation providing unit 12. According to the tactile sensation providing apparatus 4, therefore, accuracy in detection of the position of the contact to the touch sensor 11 is not significantly deteriorated.

Third Embodiment

Figure 7:
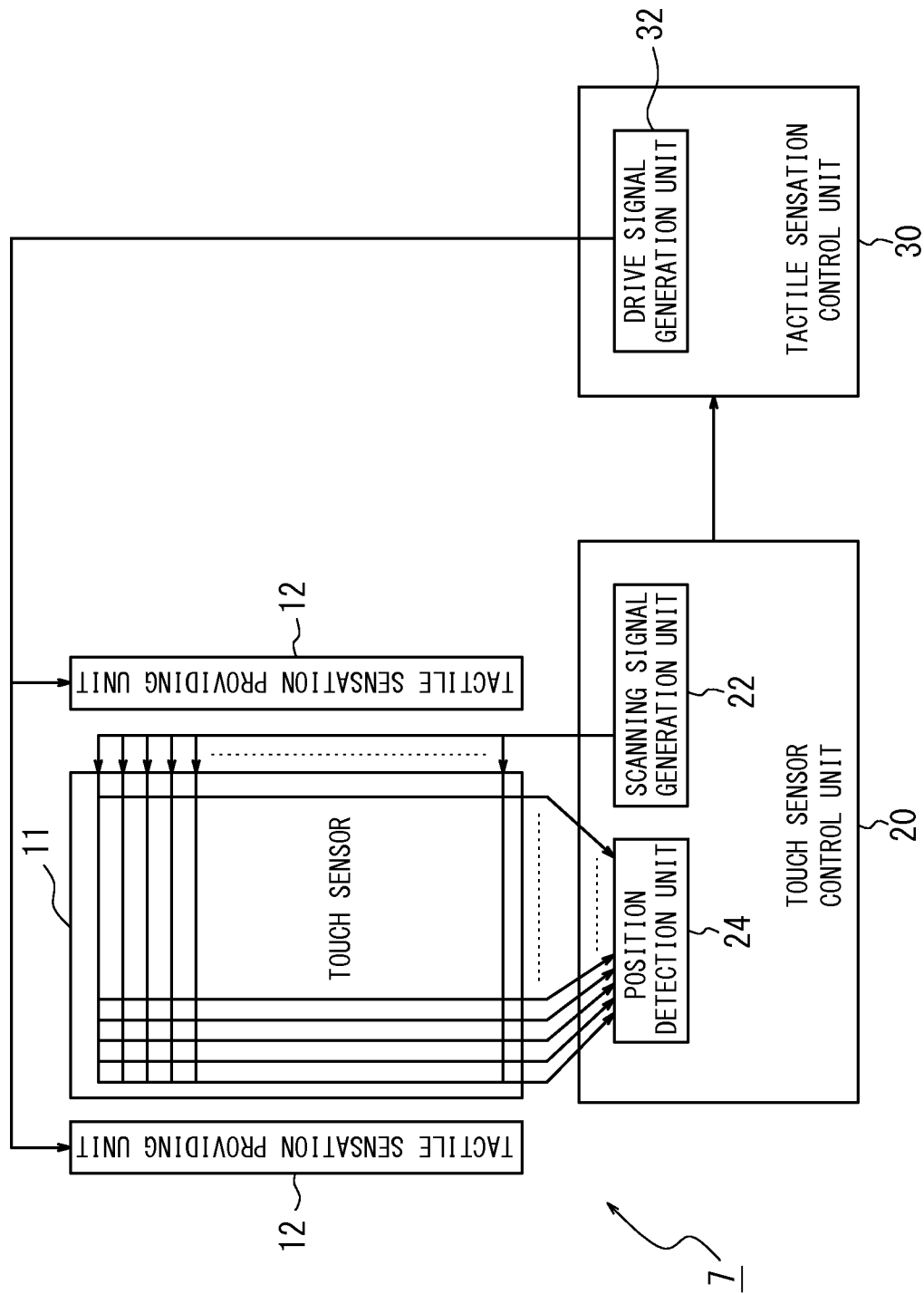
FIG. 7 is a block diagram illustrating a schematic configuration of a tactile sensation providing apparatus according to a third embodiment of the present invention.

Next, a tactile sensation providing apparatus according to a third embodiment of the present invention will be described. FIG. 7 is a functional block diagram illustrating a schematic configuration of the tactile sensation providing apparatus according to the third embodiment of the present invention.

As illustrated in FIG. 7, a tactile sensation providing apparatus 7 according to the present embodiment includes the touch sensor 11, the tactile sensation providing unit 12, the touch sensor control unit 20 and the tactile sensation control unit 30. The touch sensor control unit 20 includes the scanning signal generation unit 22 and the position detection unit 24. The tactile sensation control unit 30 includes the drive signal generation unit 32. Each of these function units may be similar to those of the tactile sensation providing apparatus 2 according to the first embodiment described with reference to FIG. 2. Accordingly, detailed descriptions thereof will be omitted.

In the tactile sensation providing apparatus 7 according to the present embodiment, the tactile sensation control unit 30 may receive, from the touch sensor control unit 20, a notification of timing at which the scanning signal generation unit 22 supplies the scanning signal.

Figure 8:
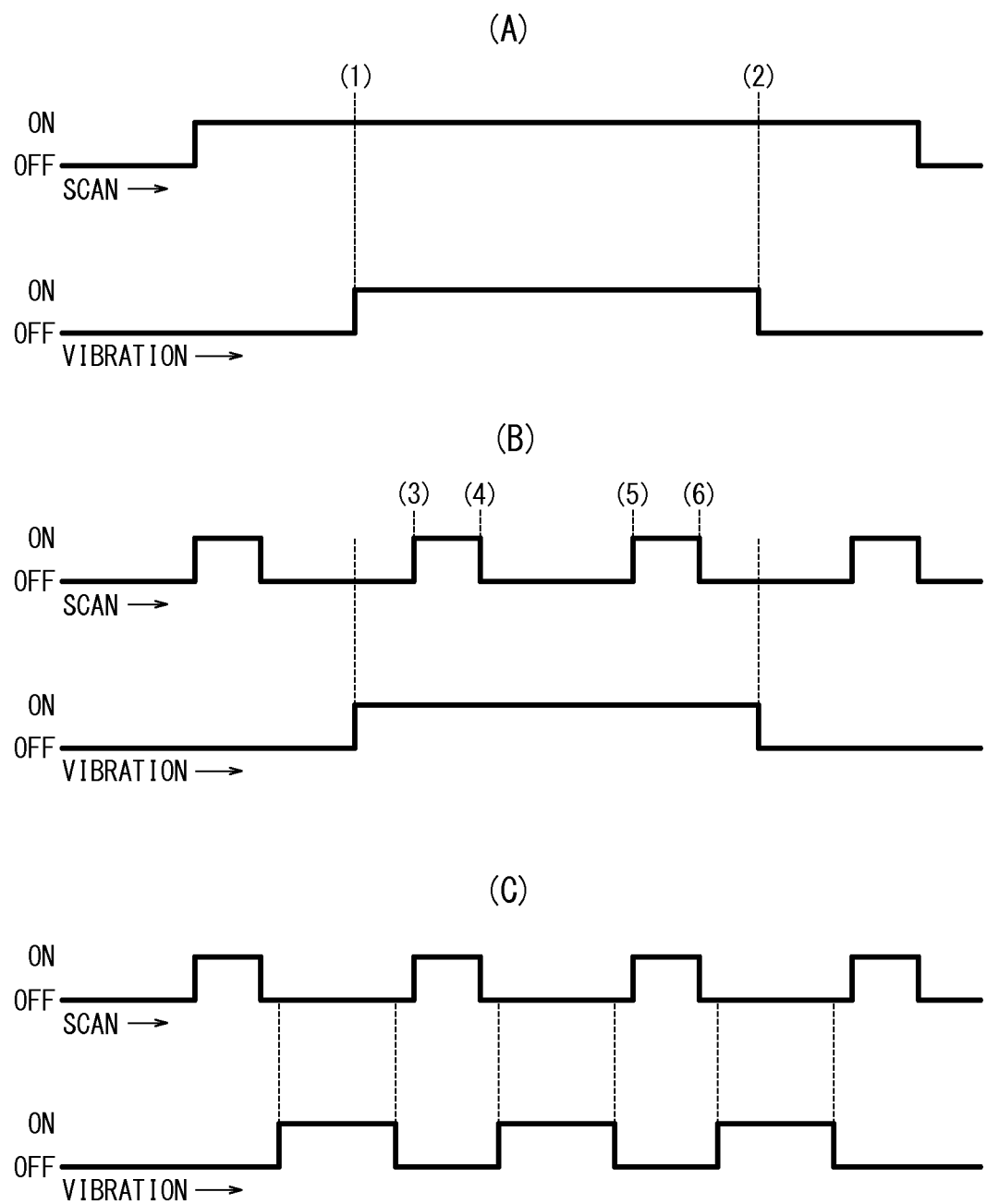
FIG. 8(A) to (C) are schematic diagrams illustrating operations of the tactile sensation providing apparatus according to the third embodiment of the present invention.

FIG. 8 is a conceptual diagram illustrating operations of the tactile sensation providing apparatus according to the present embodiment. FIG. 8(A) is a diagram illustrating a typical example of conventional provision of the tactile sensation.

Conventionally, for reasons such as incapability of a fast operation for detecting the position of the contact to the touch sensor, scanning for detecting the position of the contact has been generally performed all the time, for example, for a predetermined long time as indicated by an upper line in FIG. 8(A). A part of the upper line at an "ON" position in FIG. 8(A) indicates a period in which a signal for scanning is supplied. In such a condition, as indicated by a lower line in FIG. 8(A), in order to generate vibration at the touch sensor, the signal (drive signal) for driving a driving mechanism such as the tactile sensation providing unit, for example, is generated during a period between (1) and (2). As for the lower line of FIG. 8(A), a period having a solid line at an "ON" position indicates a period in which the drive signal is supplied. In the period between (1) and (2), however, scanning may be influenced by the noise associated with generation of the drive signal as described above.

In recent years, the fast operation of detection of the position of the contact to the touch sensor has been enabled. Therefore, when scanning for detection of the position of the contact is intermittently performed for a short period as indicated by an upper line in FIG. 8(B), for example, a good enough result may be obtained. In using the touch sensor of the capacitive type, for example, scanning at intervals of a few tens of microseconds for a few microseconds may detect the position of the contact on the touch sensor.

However, when scanning is performed intermittently as indicated by the upper line in FIG. 8(B) in order to detect the position of the contact, a problem is still caused when the drive signal is generated for a long period as indicated by a lower line in FIG. 8(B). That is, in this case also, during a period between (3) and (4) and a period between (5) and (6), the drive signal acts as noise and adversely affects the scanning.

According to the present embodiment, therefore, while the scanning is intermittently performed for detecting the position of the contact as indicated by an upper line in FIG. 8(C), the drive signal for generating vibration at the touch sensor is generated avoiding the period in which the scanning for detecting the position of the contact is performed, as indicated by a lower line in FIG. 8(C). That is, the tactile sensation control unit 30 according to the present embodiment controls such that the period in which the scanning is performed for detecting the position of the contact to the touch senor 11 and the period in which the tactile sensation providing unit 12 vibrates the touch sensor 11 do not overlap with each other. Thus, during the period for vibrating the touch sensor 11, the scanning for detecting the position of the contact to the touch sensor 11 is not performed, thereby preventing the scanning from being adversely affected by the drive signal for generating vibration acting as noise.

In the tactile sensation providing apparatus 7 according to the present embodiment, as described with reference to FIG. 7, the tactile sensation control unit 30 may receive the notification of the timing at which the scanning signal generation unit 22 supplies the scanning signal to the touch sensor 11. Because of the notification, the tactile sensation control unit 30 may know, in advance or on a real-time basis, the timing at which the scanning signal generation unit 22 of the touch sensor control unit 20 generates the scanning signal. Accordingly, based on the timing of generation of the scanning signal by the scanning signal generation unit 22 obtained in the above manner, the tactile sensation control unit 30 controls the timing such that the drive signal generated by the drive signal generation unit 32 does not overlap with generation of the scanning signal. That is, the tactile sensation control unit 30 controls the timing such that, even when receiving an instruction to provide the tactile sensation, the drive signal generation unit 32 supplies the drive signal not in the period in which the scanning signal is generated but in the period in which the scanning signal is not generated. Based on the timing controlled in this manner, the tactile sensation control unit 30 applies a drive voltage such that the tactile sensation providing unit 12 generates vibration in the period in which the touch sensor 11 is vibrated.

The tactile sensation providing apparatus 7 according to the present embodiment illustrated in FIG. 7 has been described based on an assumption that the tactile sensation control unit 30 receives the notification of the timing for supplying the scanning signal from the touch sensor control unit 20. However, the tactile sensation providing apparatus 7 according to the present embodiment is not limited to such a configuration. For example, the tactile sensation control unit 30 may directly receive the scanning signal supplied from the scanning signal generation unit 22 to the touch sensor 11 so as to obtain the timing of generation of the scanning signal on the real-time basis.

Fourth Embodiment

Next, a tactile sensation providing apparatus according to a fourth embodiment of the present invention will be described. FIG. 9 is a functional block diagram illustrating a schematic configuration of the tactile sensation providing apparatus according to the fourth embodiment of the present invention. As illustrated in FIG. 9, a tactile sensation providing apparatus 8 according to the fourth embodiment has a host controller 40 in addition to the configuration of the tactile sensation providing apparatus 7 according to the third embodiment. Other schematic configurations of the tactile sensation providing apparatus 8 may be similar to those of the tactile sensation providing apparatus 7 according to the third embodiment. Accordingly, descriptions according to the present embodiment similar to those described in the third embodiment will be appropriately omitted.

Since the tactile sensation providing apparatus 8, unlike the tactile sensation providing apparatus 7 according to the third embodiment described above, has the host controller 40, the tactile sensation control unit 30 does not need to receive the notification of the timing for supplying the scanning signal from the touch sensor control unit 20. The host controller 40 receives a result of detection of the position of the contact to the touch sensor 11 by the touch sensor control unit 20. Upon receiving the result, the host controller 40, based on an instruction from application software, determines whether to instruct the tactile sensation control unit 30 to provide the tactile sensation based on the position of the contact to the touch sensor 11. That is, the host controller 40 knows a display state on the display unit (not illustrated) disposed on a rear face of the touch sensor 11 and determines whether the position of the contact to the touch sensor 11 corresponds to a position of an object for providing the tactile sensation.

When the position of the contact to the touch sensor 11 corresponds to the position of the object for providing the tactile sensation, the host controller 40 instructs the tactile sensation control unit 30 to provide the tactile sensation. On the other hand, when the contact to the touch sensor 11 is detected and the position of the contact does not correspond to the position of the object for providing the tactile sensation, the host controller 40 does not instruct the tactile sensation control unit 30 to provide the tactile sensation.

Or, the host controller 40, based on the notification from the touch sensor control unit 20, may know the timing at which the scanning signal generation unit 22 supplies the scanning signal. Therefore, the host controller 40, in instructing the tactile sensation providing unit 30 to provide the tactile sensation, also provides the notification of the timing at which the scanning signal generation unit 22 supplies the scanning signal. According to the present embodiment also, therefore, when the tactile sensation control unit 30 receives the instruction to provide the tactile sensation, the tactile sensation control unit 30 controls the timing such that the drive signal generation unit 32 supplies the drive signal not in the period in which the scanning signal is generated but in the period in which the scanning signal is not generated.

Note that, according to the present embodiment, in a manner similar to the third embodiment, the tactile sensation control unit 30 may receive, from the touch sensor control unit 20, the notification of the timing at which the scanning signal generation unit 22 supplies the scanning signal, such that the tactile sensation control unit 30 controls the timing at which the drive signal generation unit 32 generates the drive signal. According to the present embodiment, further, the host controller 40, when instructing the tactile sensation control unit 30 to provide the tactile sensation, already knows the timing at which the scanning signal generation unit 22 supplies the scanning signal. Accordingly, the host controller 40, instead of the tactile sensation control unit 30, may control the timing to generate the drive signal during the period in which the scanning signal is not generated.

Further, the tactile sensation providing apparatus 8 according to the present embodiment illustrated in FIG. 9 has been described based on the assumption that the tactile sensation control unit 30 receives the notification of the timing for supplying the scanning signal from the host controller 40. However, the tactile sensation providing apparatus 8 according to the present embodiment is not limited to such a configuration. For example, in a manner similar to that described in the third embodiment, the tactile sensation control unit 30 may directly receive the scanning signal supplied from the scanning signal generation unit 22 to the touch sensor 11 so as to obtain the timing of generation of the scanning signal on the real-time basis.

Fifth Embodiment

Next, a tactile sensation providing apparatus according to a fifth embodiment of the present invention will be described. FIG. 10 is a functional block diagram illustrating a schematic configuration of the tactile sensation providing apparatus according to the fifth embodiment of the present invention. As illustrated in FIG. 10, a tactile sensation providing apparatus 9 according to the fourth embodiment has a load detection unit 14 in addition to the configuration of the tactile sensation providing apparatus 8 according to the fourth embodiment. Other schematic configurations of the tactile sensation providing apparatus 9 may be similar to those of the tactile sensation providing apparatus 8 according to the fourth embodiment. Accordingly, descriptions according to the present embodiment similar to those in each of the above embodiments will be appropriately omitted.

According to the present embodiment, the load detection unit 14 detects a pressure load applied on a touch face of the touch sensor 11. The load detection unit 14 is constituted by using such as, for example, a strain gauge sensor, the piezoelectric element or the like, which linearly reacts to the load.

In each of the embodiments described above, upon detection of the contact to the touch sensor 11 corresponding to the position of the object for providing the tactile sensation displayed on the display unit, the tactile sensation control unit 30 is instructed to provide the tactile sensation. However, when the tactile sensation is provided at a point when the contact is detected as described above, the tactile sensation is provided even when the operator inadvertently lightly contacts the touch sensor 11. Such an apparatus starts an operation based on the operator's inadvertent operation and is unable to provide a realistic tactile sensation (a button depression sensation) obtained when actual keys and buttons are pressed down.

In order to provide the realistic tactile sensation to the operator, the tactile sensation providing apparatus 9 stimulates a tactile sensation of the operator while stimulating a pressure sensation, by the following operation.

That is, the tactile sensation providing apparatus 9 stimulates the pressure sensation of the operator until the pressure load applied on the touch sensor 11 detected by the load detection unit 14 satisfies a standard load (for example, 1 N) for providing the tactile sensation. Then, when the pressure load satisfies the standard load, the tactile sensation providing apparatus drives the piezoelectric vibrator constituting the tactile sensation providing unit 12 with a predetermined drive signal, such that the touch face of the touch sensor is vibrated and the tactile sensation of the operator is stimulated. Thereby, the tactile sensation providing apparatus 9 may provide the operator with the tactile sensation similar to that obtained when pressing a push-button switch (push-type button switch). Accordingly, in operating an object of the push-button switch graphically depicted on the touch sensor (on the display unit, preferably), the operator may carry out a pressing operation to the touch sensor 11 feeling the realistic button depression sensation similar to that obtained when operating the actual push-button switch. Therefore, the operator would not have a feeling of strangeness. Moreover, since the operator may carry out the operation in conjunction with a perception to "have pressed" the touch sensor 11, erroneous operations may be prevented.

The drive signal to provide the tactile sensation described above, that is, a constant frequency, a cycle (wavelength), a waveform and vibration amplitude for stimulating the tactile sensation may be appropriately set according to the tactile sensation to be provided. For example, in order to provide the tactile sensation represented by a metal dome switch employed by the mobile terminal, the tactile sensation providing unit 12 is driven by a drive signal at a constant frequency of 140 Hz or higher for any of 1/4 to 5/4 cycles. The tactile sensation providing unit 12 is driven with the drive signal described above such that the touch face of the touch sensor 11 is vibrated by approximately 15 μm under the pressure load satisfying the standard load. Thereby, the realistic tactile sensation similar to that obtained when pressing the actual key may be provided to the operator.

According to the present embodiment, the tactile sensation control unit 30 monitors the pressure load applied on the touch sensor 11 detected by the load detection unit 14. Then, when the pressure load detected by the load detection unit 14 increases based on pressure by the operator on the touch sensor 11 and satisfies the predetermined standard load, the tactile sensation control unit 30 notifies the host controller 40 accordingly. Then, the host controller 40 determines whether the position of the contact to the touch sensor 11 corresponds to the position of the object for providing the tactile sensation. When the position of the contact to the touch sensor 11 corresponds to the position of the object for providing the tactile sensation, the host controller 40 instructs the tactile sensation control unit 30 to provide the tactile sensation. Upon being instructed by the host controller 40 to provide the tactile sensation, the tactile sensation control unit 30, at a timing not overlapping with generation of the scanning signal by the scanning signal generation unit 22, controls the drive signal generation unit 32 to generate the drive signal. Or, when the tactile sensation control unit 30 has preliminarily received the instruction to provide the tactile sensation (a start instruction) from the host controller 40 and the pressure load satisfies the predetermined standard load, the tactile sensation control unit 30 may provide the tactile sensation (at a timing not overlapping with generation of the scanning signal).

The load detection unit 14 detects the pressure load from, for example, an average output value of a plurality of piezoelectric elements. Here, it is preferable that the pressure load satisfying the predetermined standard load, based on the pressure load of usual pressing operations by the operator, is preset to be 1 N (Newton), for example, and resettable thereafter. Also, in order to avoid determining that the pressing load satisfies the predetermined standard load when the operator inadvertently lightly contacts the touch sensor, the predetermined standard load is set avoiding a very small value. Further, in order to provide a pressing sensation of the realistic tactile sensation described above to the operator, it is preferable to avoid setting the predetermined standard load at a very small value in consideration of normal pressure loads (for example, an average value) of pressing intended by the operator.

As described above, the tactile sensation providing apparatus 9 according to the present embodiment enables, while offering an effect similar to that of the tactile sensation providing apparatus according to the third or fourth embodiment, to prevent the erroneous operations and, further, to provide the realistic tactile sensation.

In the tactile sensation providing apparatus 9 illustrated in FIG. 10, the tactile sensation providing unit 12 and the load detection unit 14 are illustrated as separate components. However, the tactile sensation providing apparatus 9 according to the present embodiment is not limited to such a configuration. For example, in the tactile sensation providing apparatus 9, the tactile sensation providing unit 12 and the load detection unit 14 may be constituted by using a common element such as, for example, the piezoelectric element. That is, the common element such as the piezoelectric element may detect the pressure load on the touch sensor 11 and, when the pressure load satisfies the predetermined standard load, provide the predetermined tactile sensation by vibrating the touch sensor 11. Such a configuration enables to reduce the number of components disposed in the housing of the apparatus.

In this case, the tactile sensation control unit 30, by controlling such that the period in which the load detection unit 14 detects the pressure load on the touch sensor 11 and the period in which the drive signal generation unit 32 generates the drive signal do not temporally overlap with each other, may separately use functions of the common component.

It is to be understood that the present invention is not limited to the above embodiments but may be modified or changed in multiple manners. For example, in each of the above embodiments, the touch sensor control unit 20 and the tactile sensation control unit 30 are described as separate components. However, the tactile sensation providing apparatus according to the present invention is not limited to such a configuration. For example, the touch sensor control unit 20 and the tactile sensation control unit 30 may be constituted by using a one-chip controller. Also, other elements may be appropriately combined into one element, or one element may be separated into a plurality of elements.

In each of the above embodiments, the tactile sensation providing unit 12 may be constituted by using any number of piezoelectric vibrators, transparent piezoelectric elements provided on an entire face of the touch sensor or, when capable of vibrating for providing the tactile sensation, an eccentric motor which rotates by one rotation in one cycle of the drive signal.

According to the fifth embodiment described above, the load detection unit 14 may be constituted by using any number of strain gauge sensors. Moreover, the load detection unit 14 may be constituted according to an input detection scheme of the touch sensor. For example, the load detection unit 14 of the resistive film type may be constituted without using the strain gauge sensor when capable of detecting a load from a change in an output signal based on a change of resistance in accordance with a contact area. Or, the load detection unit 14 of the capacitive type may be constituted without using the strain gauge sensor when capable of detecting the load from a change in an output signal based on a change of the capacitance.

According to the tactile sensation providing apparatus of the fifth embodiment, further, the tactile sensation providing unit 12 is driven when the pressure load detected by the load detection unit 14 satisfies the standard load for providing the tactile sensation. This "when the pressure load detected by the load detection unit 14 satisfies the standard load" may represent "when the pressure load detected by the load detection unit 14 reaches a standard value for providing the tactile sensation", "when the pressure load detected by the load detection unit 14 exceeds the standard value for providing the tactile sensation", or "when the standard value for providing the tactile sensation is detected by the load detection unit 14".

REFERENCE SIGNS LIST

1-4 tactile sensation providing apparatus
7-9 tactile sensation providing apparatus
10 substrate
11 touch sensor
12 tactile sensation providing unit
14 load detection unit
16, 18 signal line
20 touch sensor control unit
22 scanning signal generation unit
24 position detection unit
30 tactile sensation control unit
32 drive signal generation unit

The invention claimed is:

1. A tactile sensation providing apparatus comprising:
   a touch sensor;
   a tactile sensation providing unit disposed near the touch sensor and configured to vibrate the touch sensor;
   a touch sensor control unit configured to transmit a scanning signal to the touch sensor and, by receiving the scanning signal from the touch sensor, to detect a position of a contact to the touch sensor;
   a cable configured to transmit the scanning signal between the touch sensor and the touch sensor control unit; and
   a tactile sensation control unit configured to, based on the position of the contact detected by the touch sensor control unit, control the tactile sensation providing unit to vibrate the touch sensor, wherein
   an electric field is generated by the tactile sensation providing unit when vibrating the touch sensor,
   the tactile sensation providing unit is entirely disposed outside of a periphery of the touch sensor such that the tactile sensation providing unit does not overlap with the cable to thereby reduce the influence of the electric field on detection of the position of the contact to the touch sensor, and
   the tactile sensation providing unit comprises a group of a plurality of piezoelectric vibrators.

2. The tactile sensation providing apparatus according to claim 1, wherein the touch sensor includes a capacitive type touch sensor.

* * * * *